US012389896B2

(12) United States Patent
Zheng et al.

(10) Patent No.: US 12,389,896 B2
(45) Date of Patent: Aug. 19, 2025

(54) OUTDOOR VISCOUS MOSQUITO KILLING LAMP

(71) Applicant: NINGBO DAYANG TECHNOLOGY CO., LTD., Zhejiang (CN)

(72) Inventors: Jun Zheng, Zhejiang (CN); Yuanai Ning, Zhejiang (CN)

(73) Assignee: NINGBO DAYANG TECHNOLOGY CO., LTD., Ningbo (JP)

( * ) Notice: Subject to any disclaimer, the term of this patent is extended or adjusted under 35 U.S.C. 154(b) by 115 days.

(21) Appl. No.: 18/135,190

(22) Filed: Apr. 17, 2023

(65) Prior Publication Data

US 2023/0329215 A1 Oct. 19, 2023

(30) Foreign Application Priority Data

Apr. 18, 2022 (CN) .......................... 202220884932.7

(51) Int. Cl.
*A01M 1/14* (2006.01)
*A01M 1/10* (2006.01)

(52) U.S. Cl.
CPC ............ *A01M 1/145* (2013.01); *A01M 1/106* (2013.01)

(58) Field of Classification Search
CPC ............................... A01M 1/106; A01M 1/145
See application file for complete search history.

(56) References Cited

U.S. PATENT DOCUMENTS

| | | | | |
|---|---|---|---|---|
| 3,023,539 A * | 3/1962 | Emerson, Jr. | ......... | A01M 1/145 43/113 |
| 4,654,998 A * | 4/1987 | Clay | ..................... | A01M 1/145 43/115 |
| 4,918,856 A * | 4/1990 | Olive | ..................... | A01M 1/145 43/113 |
| 5,259,153 A * | 11/1993 | Olive | ..................... | A01M 1/145 136/291 |
| 5,915,948 A * | 6/1999 | Kunze | ................... | A01M 1/145 43/113 |
| 6,108,965 A * | 8/2000 | Burrows | ................ | A01M 1/145 43/113 |
| 7,748,159 B1 * | 7/2010 | Wenner | ................... | A01M 1/24 43/115 |
| 10,337,675 B2 * | 7/2019 | Van Kleef | ............. | A01M 1/145 |
| 10,412,953 B2 * | 9/2019 | Van Kleef | ............... | F21V 15/01 |
| 11,241,003 B2 * | 2/2022 | Li | ............................ | A01M 1/08 |
| 11,771,073 B2 * | 10/2023 | Smith | ................... | H05B 47/125 43/132.1 |
| 11,864,547 B2 * | 1/2024 | Chang | .................... | A01M 1/023 |
| 2017/0071184 A1 * | 3/2017 | Zheng | ..................... | A01M 1/04 |
| 2017/0295772 A1 * | 10/2017 | Studer | ................... | A01M 1/145 |
| 2023/0329214 A1 * | 10/2023 | Zheng | .................... | A01M 1/145 |

* cited by examiner

*Primary Examiner* — Michael H Wang

(57) ABSTRACT

The disclosure discloses an outdoor viscous mosquito killing lamp, including a lamp body including a housing within which is disposed a lighting lamp, wherein a viscous trap chamber and a viscous trap plate are provided on the housing, and a side wall of the viscous trap chamber is provided with a first through hole configured for passage of flying insects; the side wall of the viscous trap chamber is further provided with a draw opening through which the viscous trap plate is pushed into or pulled out of the viscous trap chamber; a first viscous sticker is provided on the viscous trap plate. The outdoor mosquito eradication lamp is both safe and environmentally friendly and is convenient to be cleaned up.

19 Claims, 5 Drawing Sheets

OUTDOOR VISCOUS MOSQUITO KILLING LAMP

CROSS-REFERENCE TO RELATED APPLICATIONS

The present disclosure claims priority of Chinese Utility Model application No. 202220884932.7, filed on Apr. 18, 2022, the entire contents of which are hereby incorporated by reference.

TECHNICAL FIELD

The disclosure relates to the technical field of mosquito killing lamp, and more particularly to an outdoor viscous mosquito killing lamp.

DESCRIPTION OF THE PRIOR ART

Mosquito killing lamps are mosquito killing tools developed based on mosquitoes' behaviors, such as phototaxis, moving with air flow, sensitive to temperature, gregariousness, especially the behavior of chasing carbon dioxide wind and sex pheromone. The mosquito killing lamps can be divided into electronic mosquito killing lamps, viscous mosquito killing lamps, negative pressure airflow mosquito catching lamps. The mosquito killing lamps are a relatively environmentally friendly way to kill mosquitoes, have characteristics of simple construction, cheap sale, aesthetically pleasing, small volume, power consumption, and the like. However, the structure of the existing mosquito lamps is simple, and the efficiency of killing mosquitoes is not high, which are not conducive to the killing of mosquitoes, therefore, the use of mosquito lamp is not convenient and effective. Furthermore, the existing mosquito killing lamps attract mosquitoes through a mosquito killing lamp, and then kill mosquitoes via portion or electric shock. The portion has some off-taste or toxicity, causes some discomfort, especially brings great damage to a baby's body. For the method of killing mosquitoes via electric shock, a pungent smell is produced after the mosquito is shocked, which is not environmentally friendly or safe, and the mosquito killing lamp is not convenient to be cleaned up.

SUMMARY OF THE DISCLOSURE

The technical problem to be solved by the present disclosure is to provide an outdoor viscous mosquito killing lamp, the outdoor mosquito eradication lamp is both safe and environmentally friendly and is convenient to be cleaned up.

A technical solution of the present disclosure is to provide outdoor viscous mosquito killing lamp, including a lamp body including a housing within which is disposed a lighting lamp, wherein a viscous trap chamber and a viscous trap plate are provided on the housing, and a side wall of the viscous trap chamber is provided with a first through hole configured for passage of flying insects; the side wall of the viscous trap chamber is further provided with a draw opening through which the viscous trap plate is pushed into or pulled out of the viscous trap chamber; a first viscous sticker is provided on the viscous trap plate.

Compared to the prior art, the outdoor viscous mosquito killing lamp having the above structure of the present disclosure, has the following advantages that:

Since the side wall of the viscous trap chamber is further provided with the draw opening, and the viscous trap plate is pushed into or pulled out of the viscous trap chamber through the draw opening; the first viscous sticker is provided on the viscous trap plate; and the first viscous sticker provided on the viscous trap plate is used to kill the mosquitoes, which is safe and environment friendly and is convenient to be cleaned up.

As a development, the housing includes a lighting housing and a viscous trap housing connected to the lighting housing and arranged on an upper side of the lighting housing; the first through hole and the draw opening are provided on a sidewall of the viscous trap housing and the viscous trap chamber is formed within the viscous trap housing; the lighting lamp is arranged within the lighting housing. Such a configuration has simple structure and reasonable design.

As a development, a backing plate is arranged on a bottom of the viscous trap chamber and the viscous trap plate is slip fit over an upper side of the backing plate. With such a configuration, the backing plate is arranged under the viscous trap plate and the viscous trap plate is slid more smoothly, which results in a more reliable mounting structure.

As a development, the viscous trap housing includes: a viscous trap box having an opening at an upper end, and a viscous trap box cover covering the viscous trap box; the first through hole and the draw opening are provided on a side wall of the viscous trap box, and the viscous trap chamber is formed within the viscous trap box. Such a configuration is convenient to be disassembled and assembled.

As a development, a mosquito attracting lamp is arranged on the viscous trap box cover, a light emitted by the mosquito attracting lamp irradiates the viscous trap plate. With such a configuration, the mosquito attracting lamp is able to attract mosquitoes into the viscous trap chamber, which leads to a better viscous trap effect.

As a development, a top surface of the viscous trap box cover is provided with a mounting groove with an upper opening, a bottom of the mounting groove is provided with a light passage hole, the mosquito attracting lamp includes a mosquito attracting lamp board and a mosquito attracting lamp body, the mosquito attracting lamp body is arranged on the mosquito attracting lamp board, the light emitted by the mosquito attracting lamp board transmits through the light passage hole and irradiates the viscous trap plate. With such a configuration, the mosquito attracting lamp has simple structure and is convenient to be assembled.

As a development, a mosquito attracting lamp shade is arranged between the mosquito attracting lamp board and the bottom of the mounting groove, the mosquito attracting lamp shade include a base plate and a shade body formed on the base plate, a side of the shade body proximate to the mosquito attracting lamp board is provided with an opening, the shade body extends through the light passage hole and is exposed to an outside of the viscous trap box cover; the mosquito attracting lamp body are embedded into the shade body. Such a configuration has simple structure and is convenient to be assembled.

As a development, a solar panel is mounted on an upper side of the viscous trap box cover, the solar panel covers the upper opening of the mounting groove, the solar panel limits the mosquito attracting lamp within the mounting groove. With such a configuration, the solar panel generates electricity by using the solar energy, which saves energy and protects environment.

As a development, a hollow routing post is provided between the bottom of the mounting groove of the viscous trap box cover and a bottom of the viscous trap box, the bottom of the mounting groove is provided with a second through hole in communication with an internal cavity of the routing post, and a bottom wall of the viscous trap box is provided with a third through hole in communication with the internal cavity of the routing post. With such a configuration, wires connecting the viscous trap box cover and the viscous trap box are routed through the routing post, such that the wiring connections are convenient and the structural design is rational As a development, a side wall of the backing plate is provided with a first matching groove and the backing plate is sleeved on an outside of the routing post; a side wall of the viscous trap plate is provided with a second matching groove and the viscous trap plate is sleeved on the outside the routing post. With such a configuration, the backing plate and the viscous trap plate are simply matched to the routing post and are convenient to be assembled.

As a development, a handle is provided on one side of the viscous trap plate, the handle is exposed to an outside the draw opening. With such a configuration, the viscous trap plate is pushed and pulled more conveniently.

As a development, the lighting housing includes a lighting lamp shade having an opening at a lower end and a lighting bottom cover connected to the end with the opening of the lighting lamp shade; an upper end of the lighting lamp shade is connected to the bottom of the viscous trap box; the lighting lamp is disposed in a cavity between the lighting lamp shade and the lighting bottom cover. Such a configuration has simple structure and is convenient to be assembled.

As a development, a supporting column is arranged within the lighting lamp shade, a lower end of the supporting column is connected to the lighting bottom cover; the lighting lamp includes a lighting board and a lighting body disposed on the lighting board, the lighting board is fixedly connected to an outer surface of the supporting column. With such a configuration, the lighting lamp has simple assemble structure, that the lighting board is fixedly connected to the outer surface of the supporting column results in a better lighting effect.

As a development, the lower end of the supporting column is provided with an opening and an inner cavity of the supporting column is in communication with the inner cavity of the lighting bottom cover; a control board is mounted within a cavity between the supporting column and the lighting bottom cover, and the lighting board is electrically connected to the control board. Such a configuration facilitates connection of the lighting lamp and the control board.

As a development, the upper end of the lighting lamp shade is provided with a fourth through hole, the fourth through hole is aligned with the third through hole; a fifth through hole is provided on an upper end surface of the supporting column, the fifth through hole is aligned with the fourth through hole; wires of the mosquito attracting lamp board and the solar panel are electrically connected to the control board through the second through hole, the routing post, the third through hole, the fourth through hole, and the fifth through hole. Such a configuration facilitates connection between the mosquito attracting lamp board and the control board and between the solar panel and the control panel.

As a development, a battery is arranged within the supporting column, the battery is electrically connected to the control board; the solar panel stores power for the battery, and the battery supplies power to the lighting lamp, the mosquito attracting lamp, and the control board. With such a configuration, the solar panel stores power for the battery, such that outdoor viscous mosquito killing lamp is more convenient to be powered, and is more energy efficient and environmentally friendly to be used.

As a development, the control board includes a control module and a simulated flame lamp module electrically connected to the control module; the simulated flame lamp module causes the lighting lamp to exhibit an effect of a flame lamp. With such a configuration, the lighting lamp may exhibit the effect of a flame lamp, such that the lighting lamp has not only a lighting function but also an ornamental function.

As a development, a viscous trap paper core is sleeved on the routing post, a plurality of layers of second viscous stickers are adhered onto the viscous trap paper core, the plurality of layers of the second viscous stickers are able to be torn down layer by layer. Such a configuration is provided with the second viscous sticker, which may improve a viscous trap effect, and the second viscous stickers are able to be torn down, it is convenient to use.

Figure 1:
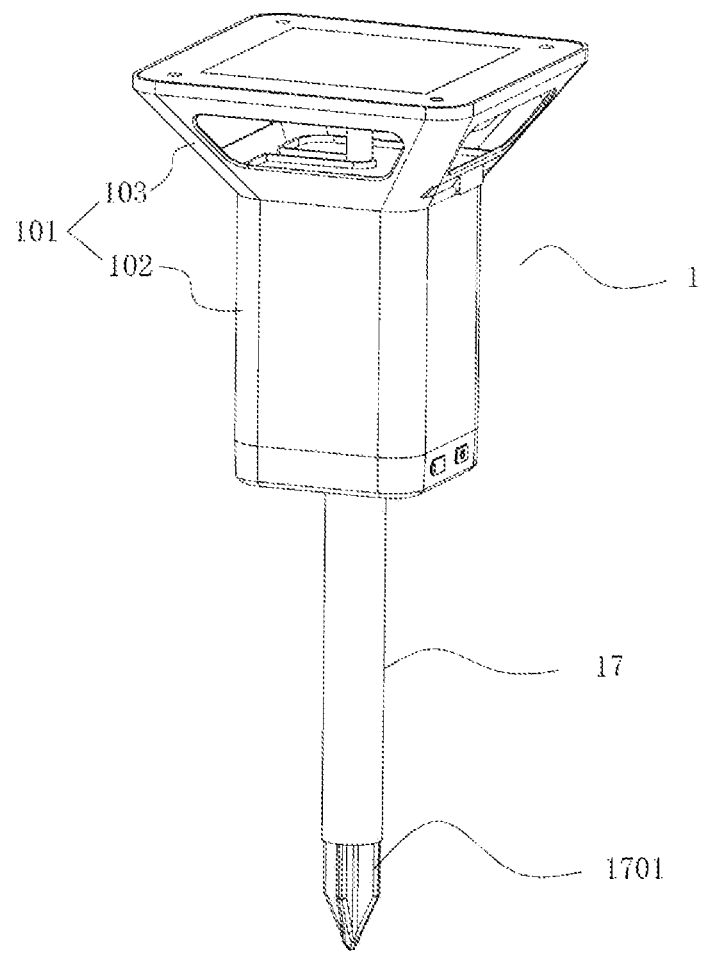
FIG. 1 is a schematic perspective view of the outdoor viscous mosquito killing lamp of the present disclosure.
Figure 2:
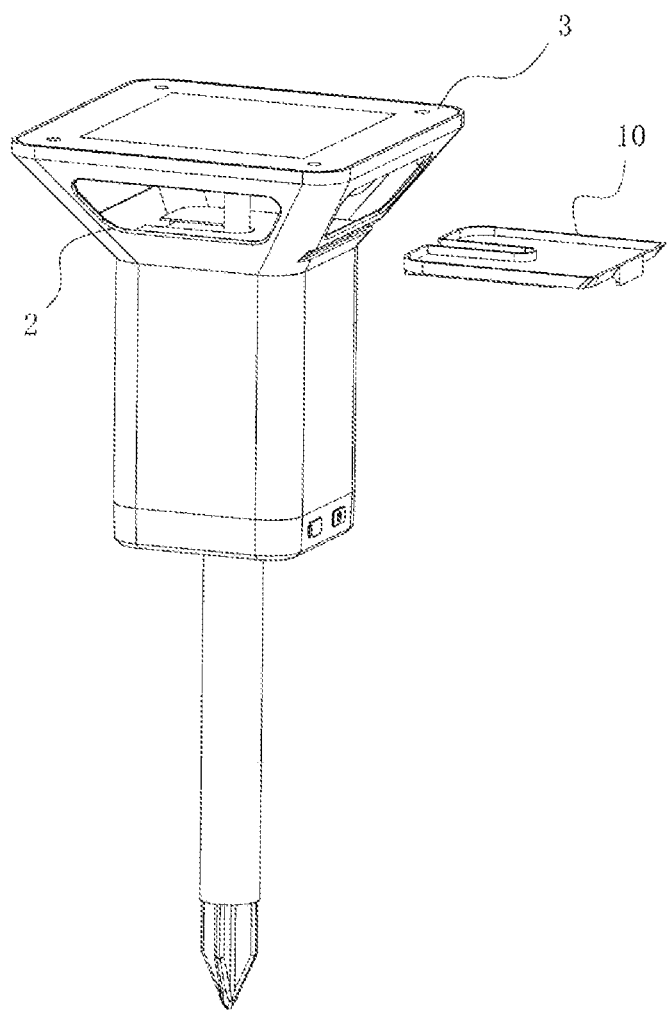
FIG. 2 is a schematic perspective view of the outdoor viscous trap mosquito killing lamp of the present disclosure separated from the viscous trap plate.
Figure 3:
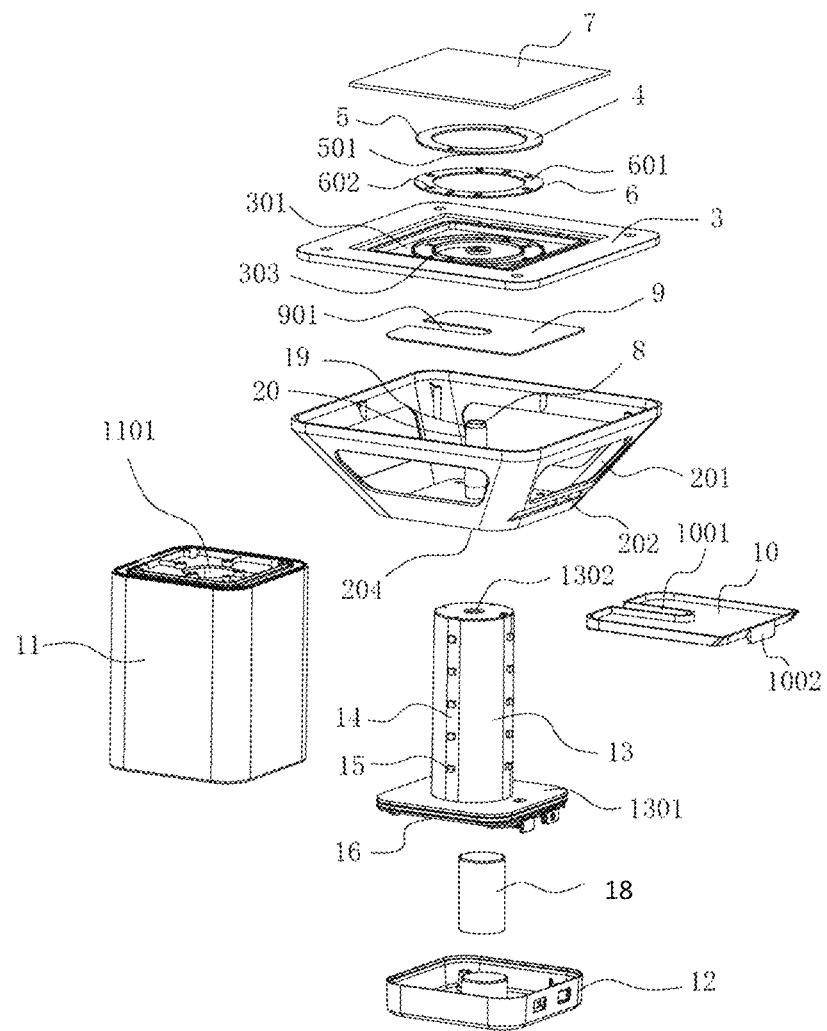
FIG. 3 is a schematic exploded view of the lamp body of the outdoor viscous trap mosquito killing lamp of the present disclosure.
Figure 4:
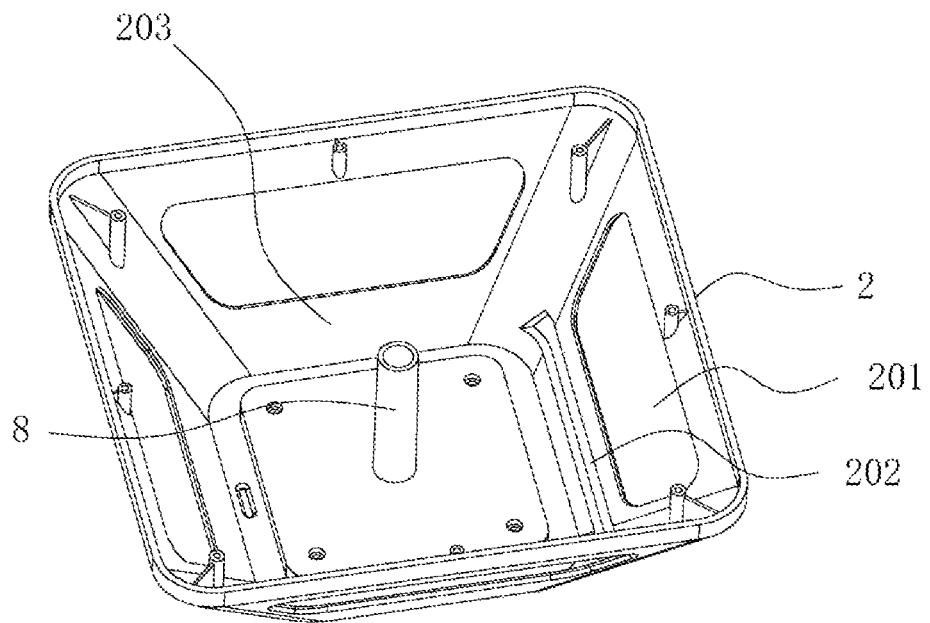
FIG. 4 is a schematic perspective view of the viscous trap box of the outdoor viscous trap mosquito killing lamp of the present disclosure.
Figure 5:
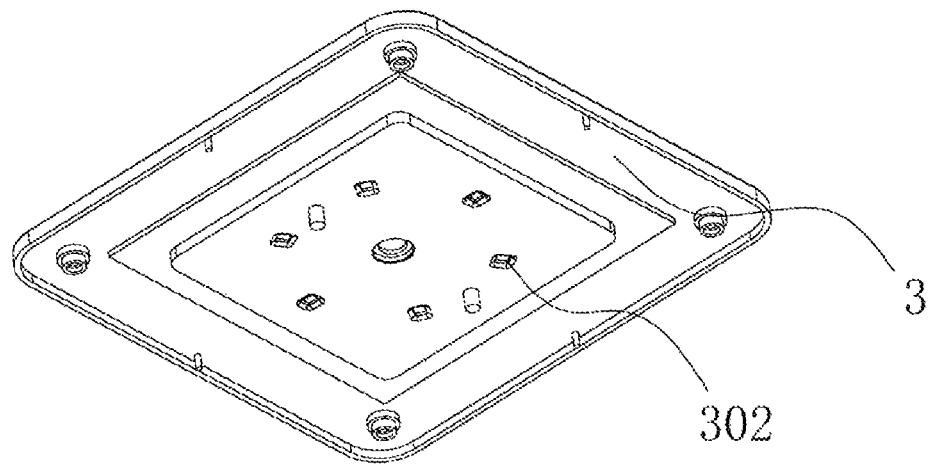
FIG. 5 is a schematic perspective view of the viscous trap box cover of the outdoor viscous trap mosquito killing lamp of the present disclosure.

The reference numbers shown in the figures are: 1 lamp body, 101 housing, 102 lighting lamp housing, 103 viscous trap housing, 2 viscous trap box, 201 first through hole, 202 draw opening, 203 viscous trap chamber, 204 third through hole, 3 viscous trap box, 301 mounting groove, 302 light passage hole, 303 second through hole, 4 mosquito attracting body, 5 mosquito attracting plate, 501 mosquito attracting lamp, 6 mosquito attracting shade, 601 base plate, 602 shade body, 7 solar panel, 8 routing post, 9 backing plate, 901 first matching groove, 10 viscous trap plate, 1001 second matching groove, 1002 handle, 11 lighting lamp shade, 1101 fourth through hole, 12 lighting bottom cover, 13 supporting column, 1301 mounting plate, 1302 fifth through hole, 14 lighting lamp plate, 15 lighting lamp body, 16 control board, 17 supporting bar, 1701 pointed cone, 18 battery, 19 viscous trap paper core, 20 second viscous sticker.

DESCRIPTION OF EMBODIMENTS

For a better understanding of the present disclosure, various aspects of the present disclosure will be explained in more detail with reference to the accompanying drawings. It is to be understood that these detailed descriptions are only illustrative of exemplary embodiments of the present disclosure and are not intended to limit the scope of the present disclosure in any way. The reference numerals refer to the same elements throughout the description.

In the drawings, the thickness, size, and shape of objects have been slightly enlarged for ease of illustration. The drawings are merely examples and are not drawn strictly to scale.

It will be further understood that the terms "includes," "comprises," "having," "including," and/or "comprising", when used in this specification, specify the presence of stated features, integers, steps, operations, elements, and/or components, but do not exclude the presence or addition of one or more other features, integers, steps, operations, elements, components, and/or combination thereof.

Embodiment One

As shown in FIG. 1, the present application discloses an outdoor viscous mosquito killing lamp including a lamp body 1 including a housing 101. The housing includes a lighting lamp housing 102 and a viscous trap housing 103 connected to the lighting housing and arranged on an upper side of the lighting housing.

As shown in FIGS. 2-5, the viscous trap housing includes: a viscous trap box 2 having an opening at an upper end; and a viscous trap box cover 3 covering the viscous trap box. A first through hole 201 and a draw opening 202 are provided on a side wall of the viscous trap box 2, and a viscous trap chamber 203 is formed within the viscous trap box 2.

A mosquito attracting lamp 501 is arranged on the viscous trap box cover 3. A top surface of the viscous trap box cover 3 is provided with a mounting groove 301 with an upper opening, a bottom of the mounting groove 301 is provided with a light passage hole 302, the mosquito attracting lamp includes a mosquito attracting lamp board 5 and a mosquito attracting lamp body 4, the mosquito attracting lamp body 4 is arranged on the mosquito attracting lamp board 5. A mosquito attracting lamp shade 6 is arranged between the mosquito attracting lamp board 5 and the bottom of the mounting groove 301, the mosquito attracting lamp shade includes a base plate and a shade body 602 formed on the base plate 601, a side of the shade body 602 proximate to the mosquito attracting lamp board 5 is provided with an opening, the shade body 602 extends through the light passage hole 302 and is exposed to an outside of the viscous trap box cover 3; the mosquito attracting lamp body 4 are embedded into the shade body 602. A solar panel 7 is mounted on an upper side of the viscous trap box cover 3, the solar panel 7 covers the upper opening of the mounting groove 301, the solar panel 7 limits the mosquito attracting lamp within the mounting groove 301.

A hollow routing post 8 is provided between the bottom of the mounting groove 301 of the viscous trap box cover 3 and a bottom of the viscous trap box 2, the bottom of the mounting groove 301 is provided with a second through hole 303 in communication with an internal cavity of the routing post 8, and a bottom wall of the viscous trap box is provided with a third through hole 204 in communication with the internal cavity of the routing post 8. A backing plate 9 is arranged on a bottom of the viscous trap chamber 203 and a viscous trap plate 10 is slip fit over an upper side of the backing plate 9. A side wall of the backing plate 9 is provided with a first matching groove 901 and the backing plate 9 is sleeved on an outside of the routing post 8; a side wall of the viscous trap plate 10 is provided with a second matching groove 1001 and the viscous trap plate 10 is sleeved on the outside the routing post 8. A handle 1002 is provided on one side of the viscous trap plate 10, the handle 1002 is exposed to an outside the draw opening 202. A light emitted by the mosquito attracting lamp board 5 transmits through the light passage hole 302 and irradiates the viscous trap plate 10.

The lighting housing includes a lighting lamp shade 116 having an opening at a lower end and a lighting bottom cover 12 connected to the end with the opening of the lighting lamp shade 116; an upper end of the lighting lamp shade 116 is connected to the bottom of the viscous trap box 2. A supporting column 13 is arranged within the lighting lamp shade 116, a side wall of a lower end of the supporting column 13 extends outwardly and forms a mounting plate 1301, and the mounting plate 1301 is arranged on the lighting bottom cover 12. A lower end of the supporting column 13 is provided with an opening, and an inner cavity of the supporting column 13 is in communication with the inner cavity of the lighting bottom cover 12.

The lighting lamp is disposed in a cavity between the lighting lamp shade 11 and the lighting bottom cover 12. The lighting lamp includes a lighting board 14 and a lighting body 15 disposed on the lighting board 14, the lighting board 14 is fixedly connected to an outer surface of the supporting column 13. More then two lighting lamps are provided, the lighting lamps are evenly distributed along a circumference of the supporting column 13 and connected on the outer surface of the supporting column 13. A control board 16 is mounted within a cavity between the supporting column 13 and the lighting bottom cover 12, and the lighting board 14 is electrically connected to the control board 16. A bottom of the lighting bottom cover 12 is connected to a supporting bar 17, a lower end of the supporting bar 17 is provided with a pointed cone 1701.

The upper end of the lighting lamp shade 11 is provided with a fourth through hole 1101, the fourth through hole is aligned with the third through hole; a fifth through hole 1302 is provided on an upper end surface of the supporting column 13, the fifth through hole is aligned with the fourth through hole; wires of the mosquito attracting lamp board 5 and the solar panel 7 are electrically connected to the control board 16 through the second through hole, the routing post, the third through hole, the fourth through hole, and the fifth through hole. A battery 18 is arranged within the supporting column 13, the battery is electrically connected to the control board 16; the solar panel 7 stores power for the battery, and the battery supplies power to the lighting lamp, the mosquito attracting lamp, and the control board 16.

Figure 6:
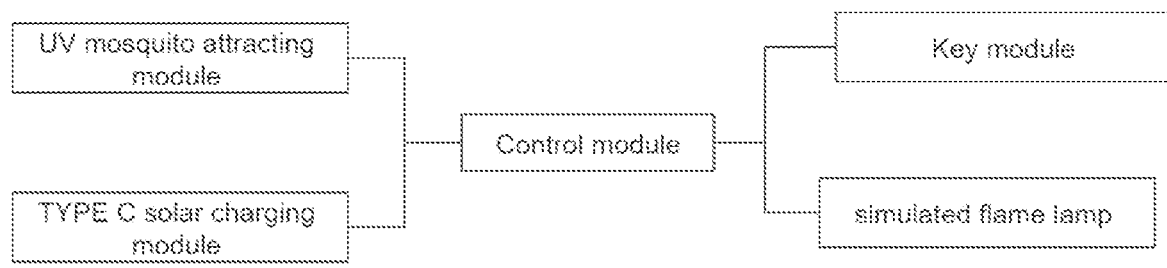
FIG. 6 is a block circuit diagram of the control board of the outdoor viscous trap mosquito killing lamp of the present disclosure.

As shown in FIG. 6, a control circuit on the control board 16 includes a control module, a key module, a simulated flame lamp module, a mosquito attracting lamp module, and a solar charging module. Each of the key module, the simulated flame lamp module, the mosquito attracting lamp module, and the solar charging module is electrically connected to the control module. The simulated flame lamp module can cause the lighting lamp to exhibit the effect of a flame lamp. The key module is used to control the simulated flame lamp module and the mosquito attracting lamp module to turn on or off. The mosquito attracting lamp module is configured to control operation of the mosquito attracting lamp, the mosquito attracting lamps are ultraviolet lamps. The solar charging module is connected to the solar panel 7, and the electric energy generated by the solar panel 7 can be used to charge the battery through the solar charging module.

When the outdoor viscous mosquito killing lamp disclosed herein is in use, the lighting lamp and the mosquito attracting lamp are turned on, and the light emitted by the lighting lamp passes through the lighting lamp shade 116 and transmits outside the lamp body 1; the light from the mosquito attracting lamp passes through the mosquito attracting lamp shade and irradiates the viscous trap plate 7. The mosquitoes are attracted by the mosquito attracting lamp, get into the viscous trap chamber 203, and are stuck to the first viscous sticker when landing on the viscous trap plate 7. After a period of use, the viscous trap plate 10 is pulled out, the first viscous sticker may be torn off, a new first viscous sticker is adhered onto the viscous trap plate 7, it is very convenient to use.

Embodiment Two

The outdoor viscous mosquito killing lamp of this embodiment differs from that of the embodiment one in that: a viscous trap paper core 19 is sleeved on the routing post 8, a plurality of layers of second viscous stickers 20 are adhered onto the viscous trap paper core, the plurality of layers of the second viscous stickers are able to be torn down layer by layer. As mosquitoes fly from the first through hole 201 into the viscous trap chamber 203, they tend to be firmly stuck by the first viscous sticker and the second viscous sticker to achieve the effect of sticking and extinguishing the mosquitoes. The second viscous stickers can be torn from the viscous trap paper core layer by layer, so that a new second viscous sticker of the inner layer may be exposed as long as the old second viscous sticker is torn off, i.e., the operation of replacing the second viscous sticker is completed. And the routing post is vertically set up in the middle of the viscous trap chamber 203, i.e., the viscous trap paper core is also vertically set up in the middle of the viscous trap chamber 203, each position on the second viscous sticker disposed on the viscous trap paper core has equal chance of sticking mosquitoes. The viscous trap box cover 3 is removed from the viscous trap box 2 to allow replacement of the viscous trap paper core, and the operation is easy and convenient.

The foregoing is merely exemplary embodiments of the disclosure and is not intended to limit the implementation scope of the disclosure; modifications and equivalents for the disclosure without departing from the spirit and scope of the disclosure are intended to be included in the protection scope of the claims.

The invention claimed is:

1. An outdoor viscous mosquito killing lamp, comprising a lamp body comprising a housing within which is disposed a lighting lamp, wherein a viscous trap chamber and a viscous trap plate are provided on the housing, and the viscous trap chamber is provided with one or more first through holes configured for passage of flying insects and a draw opening through which the viscous trap plate is pushed into or pulled out of the viscous trap chamber; and a first viscous sticker is provided on the viscous trap plate;

wherein the housing comprises a lighting housing, and a viscous trap housing with a bottom end connected to an upper side of the lighting housing; the viscous trap housing has a top end, the bottom end having a size smaller than a size of the top end, and inclined sidewalls connected between the top end and the bottom end, each of the one or more first through holes and the draw opening penetrates a corresponding sidewall of the viscous trap housing, the draw opening is spaced apart from and below the one or more first through holes, and the viscous trap chamber is formed within the viscous trap housing; the lighting lamp is arranged within the lighting housing.

2. The outdoor viscous mosquito killing lamp according to claim 1, wherein a backing plate is arranged on a bottom of the viscous trap chamber and the viscous trap plate is slip fit over an upper side of the backing plate.

3. The outdoor viscous mosquito killing lamp according to claim 2, wherein the viscous trap housing comprises: a viscous trap box having an opening at an upper end, and a viscous trap box cover covering the viscous trap box; the first through hole and the draw opening are provided on a sidewall of the viscous trap box, and the viscous trap chamber is formed within the viscous trap box.

4. The outdoor viscous mosquito killing lamp according to claim 3, wherein a mosquito attracting lamp is arranged on the viscous trap box cover, a light emitted by the mosquito attracting lamp irradiates the viscous trap plate.

5. The outdoor viscous mosquito killing lamp according to claim 4, wherein a top surface of the viscous trap box cover is provided with a mounting groove with an upper opening, a bottom of the mounting groove is provided with a light passage hole, the mosquito attracting lamp comprises a mosquito attracting lamp board and a mosquito attracting lamp body, the mosquito attracting lamp body is arranged on the mosquito attracting lamp board, the light emitted by the mosquito attracting lamp board transmits through the light passage hole and irradiates the viscous trap plate.

6. The outdoor viscous mosquito killing lamp according to claim 5, wherein an annular mosquito attracting lamp shade is arranged between the mosquito attracting lamp board and the bottom of the mounting groove, the mosquito attracting lamp shade comprises a base plate and a shade body provided on the base plate, a side of the shade body proximate to the mosquito attracting lamp board is provided with an opening, the shade body extends into the viscous trap chamber through the light passage hole of the viscous trap box cover; the mosquito attracting lamp body is embedded into the shade body.

7. The outdoor viscous mosquito killing lamp according to claim 5, wherein a hollow routing post is provided between the bottom of the mounting groove of the viscous trap box cover and a bottom of the viscous trap box, the bottom of the mounting groove is provided with a second through hole in communication with an internal cavity of the routing post, and a bottom wall of the viscous trap box is provided with a third through hole in communication with the internal cavity of the routing post.

8. The outdoor viscous mosquito killing lamp according to claim 7, wherein a sidewall of the backing plate is provided with a first matching groove and the backing plate is sleeved on an outside of the routing post; a sidewall of the viscous trap plate is provided with a second matching groove and the viscous trap plate is sleeved on the outside the routing post.

9. The outdoor viscous mosquito killing lamp according to claim 8, wherein the lighting housing comprises a lighting lamp shade having an opening at a lower end and a lighting bottom cover connected to the end with the opening of the lighting lamp shade; an upper end of the lighting lamp shade is connected to the bottom of the viscous trap box; the lighting lamp is disposed in a cavity between the lighting lamp shade and the lighting bottom cover.

10. The outdoor viscous mosquito killing lamp according to claim 9, wherein a supporting column is arranged within the lighting lamp shade, a lower end of the supporting column is connected to the lighting bottom cover; the lighting lamp comprises a lighting board and a lighting body disposed on the lighting board, the lighting board is fixedly connected to an outer surface of the supporting column.

11. The outdoor viscous mosquito killing lamp according to claim 10, wherein the lower end of the supporting column is provided with an opening and an inner cavity of the supporting column is in communication with the inner cavity of the lighting bottom cover; a control board is mounted within a cavity between the supporting column and the lighting bottom cover, and the lighting board is electrically connected to the control board.

12. The outdoor viscous mosquito killing lamp according to claim 11, wherein the upper end of the lighting lamp shade is provided with a fourth through hole, the fourth through hole is aligned with the third through hole; a fifth through hole is provided on an upper end surface of the supporting column, the fifth through hole is aligned with the fourth through hole; wires of the mosquito attracting lamp board and the solar panel are electrically connected to the control board through the second through hole, the routing post, the third through hole, the fourth through hole, and the fifth through hole.

13. The outdoor viscous mosquito killing lamp according to claim 12, wherein a battery is arranged within the supporting column, the battery is electrically connected to the control board; the solar panel stores power for the battery, and the battery supplies power to the lighting lamp, the mosquito attracting lamp, and the control board.

14. The outdoor viscous mosquito killing lamp according to claim 11, wherein the control board comprises a control module and a simulated flame lamp module electrically connected to the control module; the simulated flame lamp module causes the lighting lamp to exhibit an effect of a flame lamp.

15. The outdoor viscous mosquito killing lamp according to claim 7, wherein a viscous trap paper core is sleeved on the routing post, a plurality of layers of second viscous stickers are adhered onto the viscous trap paper core, the plurality of layers of the second viscous stickers are able to be torn down layer by layer.

16. The outdoor viscous mosquito killing lamp according to claim 4, wherein a solar panel is mounted on an upper side of the viscous trap box cover, the solar panel covers the upper opening of the mounting groove, the solar panel limits the mosquito attracting lamp within the mounting groove.

17. The outdoor viscous mosquito killing lamp according to claim 1, wherein a handle is provided on one side of the viscous trap plate, the handle is exposed to an outside the draw opening.

18. The outdoor viscous mosquito killing lamp according to claim 1, wherein the drawing opening has a size smaller than a size of each first through hole.

19. The outdoor viscous mosquito killing lamp according to claim 1, wherein four said first through holes are provided on the sidewalls respectively, the drawing opening and one of the first through holes are provided on a same sidewall, the drawing opening and the one first through hole both extend in a circumferential direction of the viscous trap housing and arranged adjacent to each other.

* * * * *